(12) United States Patent
Gorochovceva et al.

(10) Patent No.: US 8,936,159 B2
(45) Date of Patent: Jan. 20, 2015

(54) USE OF QUATERNARY AMMONIUM COMPOUNDS AS COLLECTORS IN FROTH FLOTATION PROCESSES

(75) Inventors: Natalija Gorochovceva, Hjälteby (SE); Anders Klingberg, Henån (SE)

(73) Assignee: Akzo Nobel Chemicals International B.V., Amersfoort (NL)

(*) Notice: Subject to any disclaimer, the term of this patent is extended or adjusted under 35 U.S.C. 154(b) by 127 days.

(21) Appl. No.: 13/697,801

(22) PCT Filed: May 25, 2011

(86) PCT No.: PCT/EP2011/058516
§ 371 (c)(1),
(2), (4) Date: Jan. 7, 2013

(87) PCT Pub. No.: WO2011/147855
PCT Pub. Date: Dec. 1, 2011

(65) Prior Publication Data
US 2014/0144814 A1   May 29, 2014

Related U.S. Application Data

(60) Provisional application No. 61/349,404, filed on May 28, 2010.

(30) Foreign Application Priority Data

May 28, 2010   (EP) .................................... 10164206

(51) Int. Cl.
*B03D 1/016* (2006.01)
*B03D 1/01* (2006.01)
(Continued)

(52) U.S. Cl.
CPC ........ *B03D 1/01* (2013.01); *B03D 1/016* (2013.01); *C08G 63/685* (2013.01); *B03D 1/02* (2013.01); *B03D 2203/04* (2013.01)
USPC ........................................................ 209/166

(58) Field of Classification Search
CPC ............ B03D 1/01; B03D 1/016; B03D 1/02; B03D 2203/04
USPC ................................................ 209/166; 252/61
See application file for complete search history.

(56) References Cited

U.S. PATENT DOCUMENTS

| 4,265,966 A | 5/1981 | Schuh |
| 4,995,965 A | 2/1991 | Mehaffey et al. |

(Continued)

FOREIGN PATENT DOCUMENTS

| CA | 2244899 | 7/1997 |
| DE | 196 02 856 A1 | 7/1997 |

(Continued)

OTHER PUBLICATIONS

European Search Report for corresponding EP Application No. 10164206.4; Completion date Nov. 8, 2010.
(Continued)

*Primary Examiner* — Thomas M Lithgow
(74) *Attorney, Agent, or Firm* — Matthew D. Kellam

(57) ABSTRACT

The present invention relates to the use of a polymeric quaternary ester product as a collector in a froth flotation process, to a method for froth flotation utilizing the polymeric quaternary ester, to the polymeric quaternary ester as such, and to methods for the production of the polymeric quaternary ester.

14 Claims, 1 Drawing Sheet

(51) Int. Cl.
  *C08G 63/685* (2006.01)
  *B03D 1/02* (2006.01)

(56) References Cited

U.S. PATENT DOCUMENTS

| | | | |
|---|---|---|---|
| 6,174,965 | B1 | 1/2001 | Yamashita et al. |
| 6,465,419 | B1 * | 10/2002 | Bermejo Oses et al. ...... 510/515 |
| 6,890,895 | B2 * | 5/2005 | Oses et al. ............... 510/504 |
| 2003/0013627 | A1 | 1/2003 | Bermejo Oses et al. |

FOREIGN PATENT DOCUMENTS

| | | |
|---|---|---|
| EP | 0 0 12 946 A1 | 7/1980 |
| EP | 1 025 908 A1 | 8/2000 |
| EP | 1 136 471 A1 | 9/2001 |
| EP | 1 359 211 A1 | 11/2003 |
| EP | 1 949 963 A1 | 7/2008 |
| WO | WO 97/26995 | 7/1997 |
| WO | WO 2004/073617 A2 | 9/2004 |

OTHER PUBLICATIONS

International Search Report and Written Opinion for corresponding PCT Application No. PCT/EP2011/058460; Completion date Dec. 19, 2011.

English Abstract of Japanese Patent Publication No. JP 01104693, Apr. 21, 1989.

* cited by examiner

USE OF QUATERNARY AMMONIUM COMPOUNDS AS COLLECTORS IN FROTH FLOTATION PROCESSES

CROSS-REFERENCES TO RELATED APPLICATIONS

This application is a National Stage entry of International Application PCT/EP2011/058516, filed May 25, 2011, which claims the benefit of European Patent Application No. 10164206.4, filed May 28, 2010 and U.S. Patent Application No. 61/349,404, filed May 28, 2010. The contents of the aforementioned applications are incorporated herein by reference in their entireties.

TECHNICAL FIELD OF INVENTION

The present invention relates to the use of a polymeric quaternary ester product as a collector in a froth flotation process, to a method for froth flotation utilizing the polymeric quaternary ester, to the polymeric quaternary ester as such, and to methods for the production of the polymeric quaternary ester.

TECHNICAL BACKGROUND OF THE INVENTION

The use of quaternary ammonium compounds as collectors in reverse froth flotation processes for calcite ores has long been known. The meaning of the term "reverse froth flotation" is that the froth is used for carrying the gangue mineral rather than carrying the valuable concentrate, i.e. the gangue is recovered in the froth product. See, for instance, U.S. Pat. No. 4,995,965, where calcium carbonate and impurities, such as silicate, are separated by floating the silicate and concentrating the calcium carbonate in the remainder, in the presence of collectors such as dialkyl dimethyl quaternary ammonium compounds. However, dialkyl quaternary products, such as products of formula (A) below, which are currently used for reversed flotation of calcite, have the drawback of being toxic for aqueous organisms and are also regarded as being not readily biodegradable in environment.

(A)

DE 19602856 proposes to use biodegradable ester quats as collectors in a reverse froth flotation process. These products are quaternary fatty acid alkanolamine ester salts. However, such ester quats were found to degrade, by hydrolysis and/or biologically during the flotation step, releasing fatty acid, particularly in the typical process where the aqueous phase is recycled. In the calcite reverse froth flotation process there is a risk that the fatty acid released may attach to the calcite and float the mineral, resulting in poor yields.

Recently a new class of oligomeric ester quats, such as products having formula (B) below, has been proposed in the patent application EP 1949963 A1.

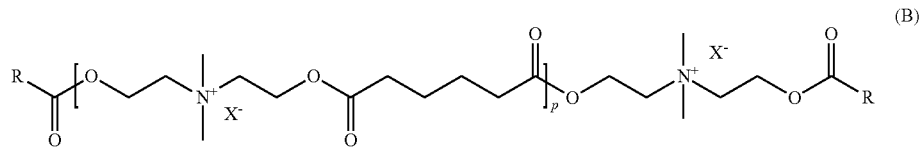

(B)

These products meet the demand of being nontoxic, readily biodegradable products that seem to be sufficiently efficient in flotation. However, they exhibit the same disadvantage as the ester quats mentioned above, with fast release of fatty acid upon hydrolysis, especially when used in a flotation process environment of high pH (around 10) and an elevated temperature (above 30° C.). The release of fatty acid soap can possess a risk as this substance has the opposite collecting properties to the ester quats, thus supporting flotation of the valuable calcite which is then going to waste (see e.g. the comparison experiment in Example 5 of the present invention).

Hence there is a continued need to optimize and/or find alternatives for the reverse froth flotation process of calcium carbonate ores. In this respect it is particularly important that the amount of acid-insoluble material in the product is as low as possible, the yield of product is as high as possible, and that a product of high quality (particularly brightness) is obtained. It should be realized that reducing the amount of acid-insoluble material and increasing the yield are two mutually conflicting goals. More specifically, reducing the amount of acid-insoluble material is typically achieved by floating off a large amount of material, but this reduces the yield, and vice versa.

SUMMARY OF THE INVENTION

It is an object of this invention to at least partially overcome the drawbacks of the prior art and to provide a flotation collector having quaternary nitrogen atoms and at the same time having advantageous environmental properties.

It is further an object of the present invention to provide an efficient flotation collector for the reverse froth flotation of ores containing silicates as impurities, especially for reverse froth flotation of ores containing calcium carbonate or ferruginous minerals, and in particular for reverse froth flotation of calcite, which gives a high yield of calcite containing a low amount of impurities.

Surprisingly, we have found that when floating calcium carbonate containing silicates as impurity, a very high yield and/or a high selectivity (low content of acid-insoluble matter) can be achieved if the reverse froth flotation process comprises the use of specific ester quaternary compounds, obtainable by the condensation of a fatty alcohol, optionally alkoxylated, a fatty acid alkanolamide, optionally alkoxylated, or an alkoxylated secondary amine, a dicarboxylic acid or a derivative thereof and an alkanolamine, where the condensation product has been quaternised by a suitable alkylating agent.

Thus, in a first aspect, the present invention relates to the use of the aforementioned products as flotation collectors, especially for the reverse froth flotation of ores containing silicates as impurities, such as ores containing calcium carbonate or ferruginous minerals, and in particular for the reverse froth flotation of calcite.

In a second aspect, the present invention relates to a method for the reverse froth flotation of calcite in the presence of these products.

In a third aspect the present invention relates to specific polymers obtainable from the condensation of a fatty alcohol, optionally alkoxylated, a fatty acid alkanolamide, optionally alkoxylated, or an alkoxylated secondary amine, with an alkanolamine, optionally alkoxylated, and an aromatic dicarboxylic acid, in particular o-phthalic acid, followed by quaternisation of the product obtained by the condensation, and in a fourth aspect the present invention relates to a method for obtaining these polymers.

These and other aspects of the present invention will be apparent from the following detailed description of the invention.

DETAILED DESCRIPTION OF THE INVENTION

Figure 1:
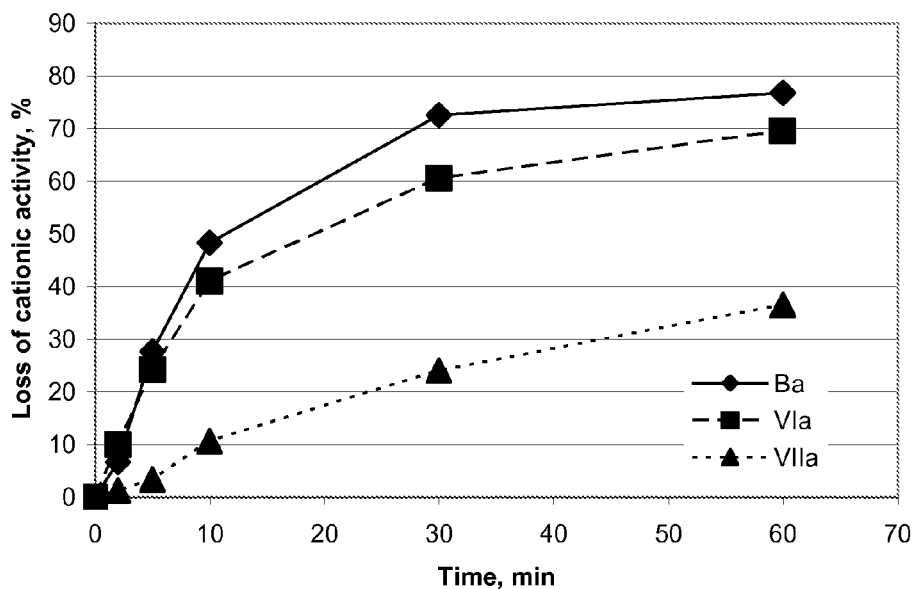
FIGS. 1 and 2 are graphs plotting experimental results from Example 6.

The present invention relates to the use of a product obtainable by the condensation of a compound having the formula (I)

where $R^1$ is a hydrocarbyl group having 7-24 carbon atoms, which may be branched or linear, saturated or unsaturated, AO is an alkyleneoxy group having 2-4 carbon atoms, n is a number between 0 and 20, and Y is O, C(=O)NH or NZ, where Z is a group $R^2$, where $R^2$ is a C1-C4 alkyl group, preferably $CH_3$, or the benzyl group; provided that when Y is NZ or C(=O)NH, then n is ≥1;

a dicarboxylic acid or a derivative thereof having the formula (IIa) or (IIb)

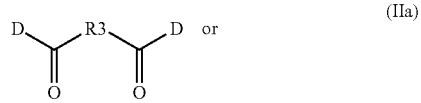

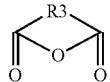

where D is —OH, —Cl, or —$OR^4$, where $R^4$ is a C1-C4 alkyl group; $R^3$ is an alkylene radical of formula —$(CH_2)_z$—, in which z is an integer from 0 to 10, preferably from 2 to 4, and most preferably 4, and in which the alkylene radical may be substituted by 1 or 2 —OH groups; the group —CH=CH—, a cycloalkylene, a cycloalkenylene or an arylene group; and an alkanolamine having the formula (III)

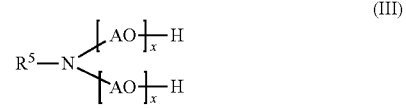

wherein each x independently is a number between 1 and 5, and Σx on average is a number between 2 and 10, AO is an alkyleneoxy group having 2-4, preferably 2, carbon atoms, $R^5$ is a C1-C3 alkyl group or a group $[AO]_x$ where AO and x have the same meaning as above; followed by reaction with an alkylating agent $R^6X$, where $R^6$ is a hydrocarbyl group, preferably a C1-C4 alkyl group or the benzyl group, and $X^-$ is an anion derived from the alkylating agent $R^6X$; as a collector in a froth flotation process.

The present invention also relates the above mentioned products as such, wherein if Y is O, then IIa above is selected from the group consisting of phtalic acid, tetrahydrophtalic acid and the acid chloride, methyl ester or ethyl ester of phtalic acid or tetrahydrophtalic acid, and IIb above is the cyclic anhydride of phtalic acid or tetrahydrophtalic acid;

The condensation products described above may be represented by the general formula

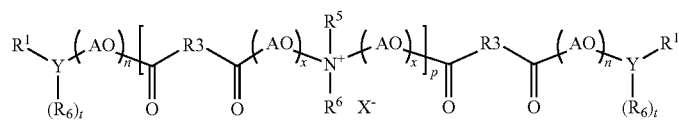

where $R^1$, Y, AO, n, R3, x and $R^5$ have the same meaning as above; t is 0 when Y is O or C(=O)NH, and t is 1 when Y is NZ; $R^6$ is a hydrocarbyl group, preferably a C1-C4 alkyl group or the benzyl group, and $X^-$ is an anion derived from the alkylating agent $R^6X$; and p is typically a number within the range 1-15, and is on average at least 1, preferably at least 2 and most preferably at least 3. The average value of p will depend on the molar ratios of the compounds (I), (IIa) or (IIb) and (III) in the reaction mixture, as well as on the reaction conditions.

The products disclosed in the examples in the experimental section, according to the GPC/SEC analysis described below, possess a polymeric nature according to REACH (EC 1907/2006, which deals with the Registration, Evaluation, Authorisation and Restriction of Chemical substances; for the REACH polymer definition see further below) with a distribution of species with different numbers of connected compounds of formula (I), (IIa) or (IIb), and (III).

According to REACH a polymer is defined as a substance meeting the criteria
   a) Over 50 percent of the weight for that substance consists of molecules comprising at least three monomeric units covalently bound to at least one other monomeric unit or other reactant
   b) The amount of molecules having the same molecular weight must be less than 50 weight percent of the substance.

In this definition monomeric unit is meant the form a monomer has when present in a polymer after the reaction.

Thus, the products of the present invention should preferably to >50% w/w consist of molecules with at least monomer 3 units (i.e. molecules where p≥3 in formula IV), more preferably the products should to >55% w/w consist of molecules with at least 3 monomer units, and most preferably the products should to >60% w/w consist of molecules with at least 3 monomer units.

Further, the GPC/SEC analysis in combination with fraction analysis using mass spectroscopy reveals that almost all molecules (>90% w/w) have a molecular weight >700. In different international regulations products with Mw>700 are considered too large to penetrate biological membranes and thereby bioaccumulate in the feed chain. This is thus an advantage of the products of the present invention from an environmental point of view.

Hereinafter, a product obtainable by the above-mentioned condensation and quaternisation is referred to as a "polymeric quaternary ester product".

An example of this kind of product has been described in EP 1136471 A1, which relates to products that are alkanolamine esters based on esterification reactions of optionally alkoxylated alkanolamines, dicarboxylic acids, and optionally alkoxylated fatty alcohols, as well as cationic surfactants and ester quats obtainable therefrom. The products are claimed to be useful in a totally different technical field than the present invention, namely as conditioning and softening agents for natural and synthetic fibres.

A suitable method for the preparation of the polymeric quaternary ester products subject of the present invention comprises the steps of mixing a compound of formula (I) as defined above with a compound of formula (IIa) or (IIb) as defined above and a compound of formula (III) as defined above, effecting an esterification condensation reaction between the compounds in the mixture, adding an alkylating agent to the condensation reaction product and effecting a quaternisation reaction of the condensation product.

The esterification condensation reactions taking place between the compounds (I), (IIa) or (IIb), and (III) are well-known per se in the art. The reactions are preferably being performed in the presence of an esterification catalyst, such as a Brönstedt or Lewis acid, for example methanesulfonic acid, p-toluenesulfonic acid, citric acid or $BF_3$. When a dicarboxylic acid derivative of formula (IIa) is used, wherein D is $O-R^4$, the reaction is a transesterification, which alternatively could be performed in the presence of an alkaline catalyst. Also other conventional techniques known by the person skilled in the art could be used starting from other derivatives of the dicarboxylic acids, such as from their anhydrides or their acid chlorides.

As would also be clear to a person skilled in the art, alternatively the esterification could be performed in more than one step, e.g. by first condensing the dicarboxylic acid derivative (IIa) or (IIb) with the alkanolamine (III), and then adding the compound (I) in a next step. The reactions could take place with or without solvents added. If solvents are present during the reaction, the solvents should be inert to esterification, e.g. toluene or xylene.

The esterification condensation reaction between the components (I), (IIa) or (IIb), and (III) is suitably effected by heating the mixture at a temperature suitably between 120 and 220° C. for a period of from 2 to 20 hours, optionally at a reduced pressure of from 5 to 200 mbar.

The molar ratio between the compound of structure (I) and the dicarboxylic acid or derivative (IIa) or (IIb) in the reaction mixture is suitably 1:1.2 to 1:10, more preferably 1:1.5 to 1:5, still more preferably 1:2 to 1:4 and most preferably 1:2 to 1:3, and the ratio between the compound of structure (I) and alkanolamine (III) is suitably 1:1 to 1:8, more preferably 1:1.2 to 1:6, still more preferably 1:1.5 to 1:5, still more preferably 1:1.5 to 1:4, still more preferably 1:1.5 to 1:3 and most preferably 1:1.5 to 1:2.5.

When Y=O the compounds of formula (I) are alcohols, or optionally alkoxylated alcohols obtained by reaction with ethylene oxide, propylene oxide, butylene oxide or mixtures thereof. Suitable examples of alcohols include, but are not limited to, so-called natural fatty alcohols that are derived from fatty acids such as coco fatty acid, tallow fatty acid, rape seed fatty acid and soya fatty acid, as well as synthetic alcohols or purified alcohols, such as octanol, 2-ethylhexanol, n-decanol, 2-propylheptanol, isodecanol, n-dodecanol, n-tetradecanol, n-hexadecanol, n-octadecanol, oleyl alcohol, and mixtures of linear synthetic alcohols, such as $C_{12}C_{14}$-alcohol, $C_{16}C_{18}$-alcohol and $C_{20}C_{22}$-alcohol. Examples of commercially available branched alcohols are the alcohols having the trade name Exxal, such as Exxal 10, Exxal 11, Exxal 12 and Exxal 13.

When Y=C(=O)NH the compounds of formula (I) are fatty acid alkanolamides obtainable from a fatty acid or a C1-C4 alkyl, preferably methyl, ester thereof, and an alkanolamine having one hydroxyl group, preferably monoethanolamine. Suitable examples of fatty acids include, but are not limited to, so-called natural fatty acids, such as coco fatty acid, tallow fatty acid, rape seed fatty acid and soya fatty acid. The alkanolamide may be alkoxylated, but preferably it is not.

When Y=NZ, the compounds of formula (I) are amines obtainable by alkoxylation of secondary amines with at least one mole of an alkylene oxide per mole amine. Suitable alkoxylated secondary amines are N-alkyl-N-methyl ethanolamines.

Specific examples of N-alkyl-N-methyl ethanolamines useful in the context of the present invention include, but are not limited to, N-(tallow alkyl)-N-methylamine+1EO, N-(rape seed alkyl)-N-methylamine+1EO, N-oleyl-N-methylamine+1EO, N-(coco alkyl)-N-methylamine+1EO, N—C12-alkyl-N-methylamine+1EO, N-(2-propylheptyl)-N-methylamine+1EO, and compounds of formula (I) wherein Y=$NCH_3$, n=1, and $R^1$ is the alkyl group of Exxal 13 or C11-alkyl.

The alkoxylation reactions are well-known per se in the art. Generally, for the products of the present invention the following applies. If more than one type of alkylene oxide is reacted with the alcohol, alkanolamide or the secondary amine, the different alkylene oxides may be added in blocks in either order, or may be added randomly. The alkoxylation may be performed by any suitable method known in the art by using e.g. an alkaline catalyst, such as KOH, or an acid catalyst. More information about alkoxylation of amines is given in the paragraph discussing the co-collector (IX).

The dicarboxylic acid derivative of general formula (IIa) or (IIb) could be a dicarboxylic acid as such, a dicarboxylic acid chloride, a diester of a dicarboxylic acid, or a cyclic anhydride of a dicarboxylic acid. The most suitable derivatives are the dicarboxylic acids and their corresponding cyclic anhydrides. Illustrative examples of dicarboxylic acid derivatives include oxalic acid, malonic acid, succinic acid, glutaric acid, adipic acid, pimelic acid, phthalic acid, tetrahydrophthalic acid, maleic acid, malic acid, tartaric acid, their corresponding acid chlorides, their corresponding methyl or ethyl esters, and their corresponding cyclic anhydrides. It is to be noted that tetrahydrophtalic acid, and consequently also the derivatives thereof, exists in at least two isomeric forms, 1,2,3,6-tetrahydrophtalic acid and 3,4,5,6-tetrahydrophtalic acid. Both these isomers are intended to be included in the general term "tetrahydrophtalic acid". 1,2,3,6-tetrahydrophtalic acid is currently the preferred isomer of tetrahydrophtalic acid, both as such and as its derivatives.

In preferred embodiments, the dicarboxylic acid derivative of general formula (IIa) or (IIb) is tetrahydrophtalic acid, the acid chloride of tetrahydrophtalic acid, methyl or etyl esters of tetrahydrophtalic acid, or the cyclic anhydride of tetrahydrophtalic acid, more preferably the cyclic anhydride of tetrahydrophtalic acid.

Suitable alkanolamines are N-methyl diethanolamine and N-methyl diisopropanolamine, optionally alkoxylated with ethylene oxide, propylene oxide, butylene oxide or mixtures thereof. If more than one alkylene oxide is reacted with the alkanolamine, the different alkylene oxides may be added in blocks in either order, or may be added randomly.

Also quaternisation is a reaction type that is well-known in the art. For the quaternisation step, the alkylating agents are suitably selected from the group consisting of methyl chloride, methyl bromide, dimethyl sulphate, diethyl sulphate, dimethyl carbonate and benzyl chloride, the most preferred alkylating agents being methyl chloride, dimethyl sulphate, dimethyl carbonate or benzyl chloride. Principally, following an alternative synthesis route, the quaternisation of the alkanolamine and/or the compound (I) where Y is NZ could be performed as a first step, which would then be followed by an esterification reaction between (I) or quaternised (I), (IIa) or (IIb) and quaternised (III). The quaternisation reaction is normally performed in water or a solvent, such as isopropanol (IPA) or ethanol, or in mixtures thereof, the most preferred solvent being IPA.

The reaction temperature of the quaternising reaction is suitably in the range of from 20 to 100° C., preferably at least 40, more preferably at least 50 and most preferably at least 55° C., and preferably at most 90° C. The heating is preferably stopped when the amount of basic nitrogen is ≤0.1 mmol/g, as measured by titration with 0.1 M perchloric acid in glacial acetic acid.

In one embodiment the polymeric quaternary ester products obtainable by the above described process may have the following formula

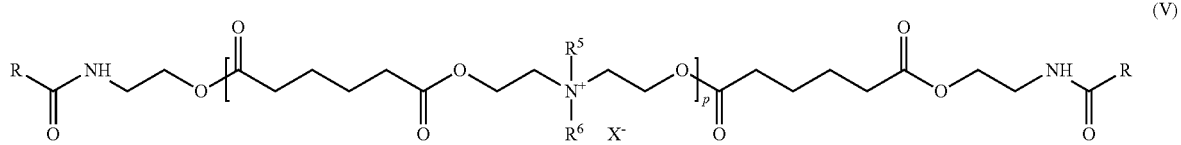

(V)

where RC=O is a linear or branched, saturated or unsaturated acyl group having 8 to 24 carbon atoms and p=1-15, preferably p is on average ≥3; $R^5$ is a C1-C3 alkyl group, preferably methyl, $R^6$ is a C1-C4 hydrocarbyl group, preferably methyl, and X=Cl, Br, $CH_3OSO_3$, or $CH_3OCO_2$.

In this embodiment the compounds are obtainable by reacting, in a first step, a fatty acid ethanolamide with adipic acid and e.g. N-methyl diethanolamine, whereafter the resulting product is quaternised by e.g. methyl chloride.

In one further embodiment the polymeric quaternary ester products obtainable by the above described process may have the following formula (VI)

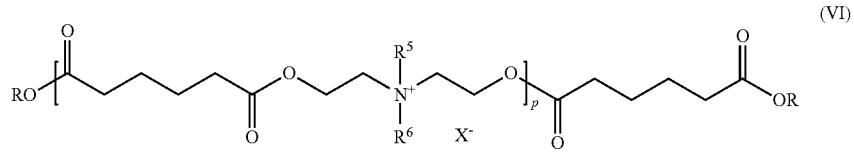

(VI)

where R is a linear or branched, saturated or unsaturated hydrocarbyl group having 8 to 24 carbon atoms and p=1-15, preferably p is on average ≥3; $R^5$ is a C1-C3 alkyl group, preferably methyl, $R^6$ is a C1-C4 hydrocarbyl group, preferably methyl, and X=Cl, Br, $CH_3OSO_3$, or $CH_3OCO_2$.

In this embodiment the compounds are obtainable by reacting, in a first step, a fatty alcohol ROH with adipic acid and e.g. N-methyl diethanolamine, whereafter the resulting product is quaternised by e.g. methyl chloride.

In another embodiment, the quaternized condensation products obtainable by the above mentioned process may have the formula (VII)

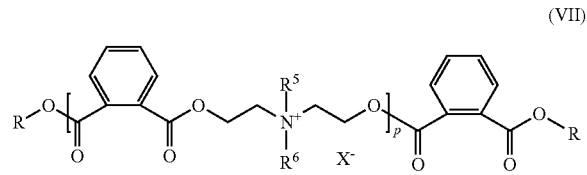

(VII)

where R is a linear or branched, saturated or unsaturated hydrocarbyl group having 8 to 24 carbon atoms and p=1-15, preferably p is on average ≥3; $R^5$ is a C1-C3 alkyl group, preferably methyl, $R^6$ is a C1-C4 hydrocarbyl group, preferably methyl, and $X=Cl$, $Br$, $CH_3OSO_3$, or $CH_3OCO_2$.

In this embodiment the products are obtainable by reacting, in a first step, a fatty alcohol with o-phthalic acid or its cyclic anhydride, and e.g. N-methyl diethanolamine, whereafter the resulting product is quaternised by an alkylating agent, e.g. methyl chloride.

In yet another embodiment, the products obtainable by the above mentioned process may have the formula

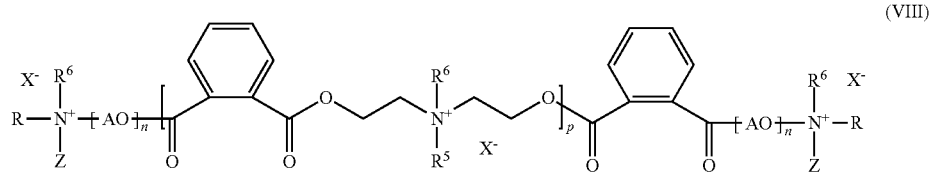

(VIII)

where R is a linear or branched, saturated or unsaturated hydrocarbyl group having 8 to 24 carbon atoms, AO is an alkyleneoxy group having 2-4, preferably 2, carbon atoms, n is a number between 1 and 20, preferably 1; Z is a group $R^2$, where $R^2$ is a C1-C4 alkyl group, preferably methyl, or the benzyl group, p=1-15, preferably p is on average ≥3, $R^5$ is a C1-C3 alkyl group, preferably methyl, $R^6$ is a C1-C4 hydrocarbyl group, preferably methyl, and $X=Cl$, $Br$, $CH_3OSO_3$, or $CH_3OCO_2$.

An example of a product according to this embodiment is obtainable by reacting, in a first step, an alkoxylated N-(fatty alkyl)-N-methylamine with o-phthalic acid or its cyclic anhydride, and e.g. N-methyl diethanolamine, whereafter the resulting product is quaternised by e.g. methyl chloride.

In one aspect, the present invention relates to the products per se that are obtainable by the method described above, with the proviso that when Y in formula (I) above is O, then $R^3$ in formula (IIa) and (IIb) is a cycloalkylene, a cycloalkenylene or an arylene group.

Upon hydrolysis, none of the products (VI)-(VIII) obtainable by the method described above will release fatty acid soap, since fatty acid is not a building block for these products, and as regards product (V) this will be more stable towards hydrolysis than the prior art compounds of type (B). This is due to the fact that for the products V the fatty acid is connected via an amide bond, which is much more resistant towards hydrolysis than an ester bond in the described environment, and thus release of fatty acid soap will not occur to any significant degree during the flotation process.

Further, as regards the embodiments containing o-phthalic acid or a derivative thereof as component (IIa) or (IIb), the ester bonds connecting the o-phthalic acid to the rest of the molecule seem to be more resistant than ordinary ester bonds towards hydrolysis This offers a special advantage since the selectivity for silicates of the products containing such bonds are not lost as quickly as for products of e.g. type (B) (see Example 6).

The product obtainable when compound (I) is an alkoxylated N-(fatty alkyl)-N-methylamine, as represented by e.g. a product having formula (VIII), has, in comparison with the other embodiments with a comparable molecular weight, additional positively charged nitrogen atoms present in the polymer end-groups. Further, in general, when compound (I), (IIa) or (IIb) and (III) are reacted together, there may arise a by-product where 2 moles of (I) reacts with just one mole of (IIa) or (IIb) and no (III) is involved in the reaction. As regards the polymeric quaternary ester products of the invention arising from a compound (I) where Y is O or C(=O)NH, these by-products will not be carrying any quaternary nitrogens at all and thus probably be more or less inactive in the flotation process, whereas the by-products arising from a compound (I) where Y is NZ will contain such nitrogens. Thus, the latter by-products would be expected to be able to act as collectors for silicate and would not just constitute "ballast" in the polymeric quaternary ester product.

As already mentioned above, the polymeric quaternary ester products of the present invention are useful as collectors in froth flotation processes.

Especially they are useful as collectors in reverse froth flotation of silicate from ores, i.e. processes where the silicate is collected in the froth product. Examples of ores that contain silica, where the products of the present invention are useful includes ores that contain calcium carbonate or ferruginous minerals, especially calcite, magnesite, dolomite, hematite and magnetite ores.

The products exhibit a good stability around pH 7, and should preferably be stored at a pH of 3.5-7.

During the flotation process pH could vary between 5 and 10, and the actual range will depend on the specific ore being used in the process. For example iron-containing ores would normally be flotated at a pH in the range of 6-8, whereas for ores containing calcium carbonate the range would normally be 8.5-10.

The polymeric quaternary ester products of the present invention can be applied in the froth flotation process in conventional amounts. Suitably they are used in a total amount of 50-2,000 grams per metric ton (MT) of ore.

The efficiency and selectivity of the polymeric quaternary ester product of the present invention may be further enhanced by the addition of a co-collector. An especially good co-collector is an alkoxylated amine having the formula

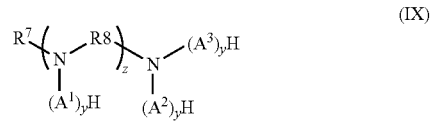

(IX)

where $R^7$ is a hydrocarbyl group having 8-22, preferably 10-20 carbon atoms, which group may be branched or linear, saturated or unsaturated, $R^8$ is an alkylene group having 2-3 carbon atoms, z is a number 0-3, preferably 0 or 1, $A^1$, $A^2$ and $A^3$ are an alkyleneoxy group having 2-4 carbon atoms, y is a number 3-20, and the sum of all y is 10-60, preferably 10-40 and most preferably 12-30. Of all the alkoxyleneoxy groups in the alkoxylated amine (IX), preferably 70-100% of the groups are ethyleneoxy groups and 0-30% propyleneoxy groups. Most preferred are the products where all alkyleneoxy groups are ethyleneoxy groups. If more than one type of alkylene oxide is reacted with the amine, the different alkylene oxides may be added in blocks in either order, or may be added randomly. Such products have been described in WO 94/26419 to be used in combination with quaternary ammonium compounds in a flotation process to purify calcium carbonate from silicates.

Alkylamines that could be used as starting materials for the alkoxylated alkylamines (IX) are fatty alkyl monoamines according to the formula $R^9NH_2$, fatty alkyl diamines according to the formula $R^9NHCH_2CH_2CH_2NH_2$, linear fatty alkyl triamines according to the formula $R^9(NHCH_2CH_2CH_2)_2NH_2$, and linear fatty alkyl tetraamines according to the formula $R^9(NHCH_2CH_2CH_2)_3NH_2$, where $R^9$ is an aliphatic group having 8-22, preferably 12-22 carbon atoms. Examples of fatty alkyl groups are coco alkyl, tallow alkyl, oleyl, rape seed alkyl, soya alkyl and erucyl.

The ethoxylation, propoxylation and butoxylation reactions are well known in the art. Normally all primary and secondary amino groups are alkoxylated in a first step in the absence of any catalyst, to obtain amino groups fully substituted by hydroxyalkyl groups, i.e. no hydrogens normally remain on the nitrogen atoms. If further alkylene oxide is to be added, typically an alkali metal hydroxide is used as a catalyst, preferably KOH. However, the choice of catalyst is not critical, and there are many catalysts known to the person skilled in the art that could equally well be used. Wherever the degree of alkoxylation is discussed, the numbers referred to are molar average numbers; i.e. the number of moles of alkylene oxide that has been reacted with one mole of the amine. Thus, as regards the specific amino compounds exemplified below, the indicated number of ethylene oxide (EO) units and propylene oxide (PO) units added to an amino compound is the average of the number of ethyleneoxy and propyleneoxy groups introduced into the molecule.

Suitable examples of alkoxylated amines of formula (IX) are (tallow alkyl)amine+15EO, (tallow alkyl)amine+20EO, (rape seed alkyl)amine+15EO, (rape seed alkyl)amine+20EO, (coco alkyl)amine+12EO, (tallow alkyl)amine+15EO+3 PO, oleylamine+15EO+5PO, N-oleyl-trimethylenediamine+25EO, N-(tallow alkyl)trimethylenediamine+30EO, N-(rape seed alkyl)trimethylenediamine+40EO, N-(soya alkyl)trimethylenediamine+40EO, N-oleyl-N''-(3-aminopropyl)-1,3-propanediamine+30EO, N-(tallow alkyl)-N''-(3-aminopropyl)-1,3-propanediamine+35EO, N-(rape seed alkyl)-N''-(3-aminopropyl)-1,3-propanediamine+45EO, N-(3-aminopropyl)-N''-[3-(9-octadecenylamino)propyl]-1,3-propanediamine+35EO, and N-(3-aminopropyl)-N''-[3-(rape seed alkylamino)propyl]-1,3-propanediamine+50EO.

The weight ratio between the polymeric quaternary ester product and the alkoxylated amine (IX) is suitably 3:2-11:1, preferably 7:3-9:1.

When a co-collector is used in the flotation process, the polymeric quaternary ester product and the co-collector may be added in separate steps, but are preferably added together as a single flotation agent. The total content of the two compounds may vary within wide limits but generally amounts to 50-2000, preferably 200-1000 grams per metric ton (MT) of ore to be floated.

It is noted that in the present froth flotation processes the ore that is treated should preferably be milled such that very small particles are being processed. A $d_{80}$ of less than 1 mm, preferably less than 0.3 mm is preferred, meaning that at least 80% of the particles have a size of less than 1 mm, preferably less than 0.3 mm (as determined by sieving). Older technologies where very coarse particles (with a $d_{50}$ of around 2 mm in size) are used are not comparable because such coarse particles are not floatable, resulting in very poor yields and/or quality.

Using a froth flotation process according to the invention, it was found that a mineral could be obtained in high yields, with low levels of acid insolubles, and with good brightness.

In a froth flotation process according to the invention, it is foreseen that further additives may be used to optimize the yield and/or quality of the reverse froth flotation process. This is particularly the case if the ore is not only contaminated with silicates but also comprises contaminants of the ore that are more hydrophobic than the ore particles. Typical additives that can be used to assist in the removal of those contaminants are substances with a water-solubility lower than the water-solubility of the collectors being used and which attach to the hydrophobic contaminants of the ore. Examples of such hydrophobic contaminants are various sulphides and graphite (coal). Examples of conventional additives that may be used to remove some of these hydrophobic contaminants include, but are not limited to, oils, including hydrocarbons, such as fuel oils, pine oil, pine tar oil, and kerosene, polar oils, cresylic acid, alcohols, such as polyglycols, e.g. polypropylene glycols with 3-7 propoxy units, 4-methyl-2-pentanol, and 2-ethyl hexanol, ethers, such as 1,1,3-triethoxy butane, esters, and certain alkoxylated amines as disclosed in, for instance, the above-mentioned WO 94/26419. These additives can be used in the process in conventional amounts. Suitably they are used in an amount of 10-1,000 grams per metric ton (MT) of ore.

In a froth flotation process of the present invention, it is possible to add, in addition to the additives mentioned above, other additives which are well-known in froth flotation. Examples of such additives are pH-adjusting agents, such as sodium carbonate and sodium hydroxide, depressants, such as starch, quebracho, tannin, dextrin and guar gum, and polyelectrolytes, such as polyphosphate and water glass, which have a dispersant effect, often combined with a depressant effect. Other conventional additives are foaming agents, such as methyl isobutyl carbinol, triethoxybutane, and polypropylene oxide and its alkyl ethers. As said, these foaming agents can also be used to remove hydrophobic contaminants from the ore, if present.

The invention is further illustrated by the following examples.

EXAMPLES

General Experimental
Molecular Weight Determination

The molecular weights and/or molecular weight ranges given in the examples in the experimental section were determined by the following method:

For separation, a SEC (Size Exclusion Chromatography) column was used. This means that porous particles are used to separate molecules of different sizes, and the molecules with the largest space-filling volume (more strictly, hydrodynamic radius) have the shortest retention times. Thus, in essence, in a SEC system the largest molecules elute first and the smallest molecules elute last.

The samples were dissolved in tetrahydrofuran and injected on a GPC/SEC-system (Gel Permeation Chromatography/Size Exclusion Chromatography), and then the fractions collected were analyzed by mass spectrometry.

Analytical Description for Molecular Weight Determination of Polymer

The sample was dissolved in tetrahydrofuran and injected on a SEC-system with three columns to separate the different homologues from each other. Each peak was collected as one fraction and the solvent was evaporated. The residue of each fraction was dissolved in acetonitrile/water 95/5 containing 0.5% acetic acid and injected via direct infusion into the ion trap MS detector. The molecular weights were determined for the different fractions.

Analytical Conditions SEC
Precolumn: Phenogel 5μ linear 50×7.8 mm (Phenomenex)
Columns: Phenogel 5μ 300×7.8 mm, three columns in series with pore sizes 500 Å, 100 Å, 50 Å (Phenomenex)
Mobile phase: Tetrahydrofuran
Flow: 0.8 ml/min
Injection volume: 100 μl
Detector: Refractive Index
Analytical Conditions Mass Spectrometer
Direct infusion via syringe pump into LCQDuo (ThermoFinnigan) Ion Trap with ESI positive mode
Full Scan Mass Range: 150-2000 m/z Example 1

Synthesis of Va

Esterification:
153.11 g (0.42 mol) of a rape seed monoethanolamide, 122.94 g (0.84 mol) of adipic acid and 75.21 g (0.63 mol) of N-methyldiethanolamine were added to a round bottom flask, fitted with a condenser, a thermometer, a heating mantel, a nitrogen inlet and a mechanical stirrer. The temperature of the reaction mixture was gradually raised to 170° C. and the water produced during the reaction was distilled off. The distillation was carried out at 154-171° C.; first at atmospheric pressure, and then vacuum was applied and distillation was continued. The progress of the reaction was evaluated by the determination of the acid value and by NMR spectroscopy. After 14 h at 175° C. and 14 mbar the acid value had decreased to ≤0.2 me/g and the reaction was stopped.

Quaternisation:
279.0 g (0.18 mol) of the obtained polyesterpolyamine and 50.0 g of IPA was transferred to the quaternisation autoclave, where it was heated to 60° C. Thereafter 30.5 g (0.60 mol) of methyl chloride was added, and a strong exothermic reaction took place. The reaction mixture was then further heated at 86° C. When the pressure in the autoclave became constant, the total amount of basic nitrogen had dropped to ≤0.09 mmol/g, and the $^1$H-NMR spectrum of the solution of the product did not show any changes, the reaction was stopped. The final product was a dark brown homogeneous viscous liquid.

Example 2

Synthesis of VIa

Esterification:
76.45 g (0.3902 mol) Alfol 1216 (a mixture of 1-dodecanol, 1-tetradecanol and 1-hexadecanol, available from Sasol Olefins and Surfactants), 115.3 g (0.7890 mol) adipic acid and 71.54 g (0.6003 mol) methyldiethanolamine were added to a round bottom flask, fitted with a condenser, a thermometer, a heating mantel, a nitrogen inlet and a mechanical stirrer. The temperature of the reaction mixture was gradually raised to 160° C. and the water produced during the reaction was distilled off. The distillation of the water started at 154° C. and was continued for 1.5 h at 164-175° C. and atmospheric pressure. Then vacuum was applied and distillation was continued for 5 more hours. The progress of the reaction was evaluated by the determination of the acid value and by $^1$H-NMR spectroscopy. After 5 h at 172° C. and 15 mbar the acid value had decreased to 0.22 me/g and the reaction was stopped. 225 g of the product was obtained. The product is viscous when cold.

By using the SEC/MS method described above under "General Experimental" the esterified, unquaternised product, obtained by the procedure above, was shown to >67 area-% consist of molecules with three or more monomer units (precursor product for product of formula (VIa) where p≥3). The distribution range is broad, and no individual molecule amounts to >15 area-% of the total product mixture. With molecules of very similar structure analyzed by refractive index detector, area % can be approximated to weight %. This means that this product is a polymer according to the REACH polymer definition. Further, more than 90 area % of the product species have a molecular weight above 700, and 67 area % have a molecular weight of 1150 and higher.

Quaternisation:
212.51 g (0.1786 mol) of the obtained polyesterpolyamine, warmed up to about 30° C., and 53.4 g IPA was transferred to the quaternisation autoclave, where it was heated to 56° C. Thereafter a total of 27.3 g (3.05 mol) of methyl chloride was added in 2 portions; the first portion (20 g) during a period of 6 min, and the remaining portion (7.3 g) after 2.5 h. The reaction mixture was then further heated at 74±2.0° C. for 8 h, after which the $^1$H-NMR spectrum of the solution of the product did not show any more changes. The final product was then discharged from the autoclave, and 23.96 g of IPA was added. The final product was a dark brown viscous liquid containing 25.5% of IPA.

Example 3

Synthesis of VIIa

Esterification:
101.9 g (0.52 mol) of Alfol 1216, 154.3 g (1.04 mol) of phthalic acid anhydride and 93.48 g (0.78 mol) of N-methyldiethanolamine were added to a round bottom flask, fitted with a condenser, a thermometer, a heating mantel, a nitrogen inlet and a mechanical stirrer. The temperature of the reaction mixture was gradually raised to 165° C. and the water produced during the reaction was distilled off. The distillation was carried out at 165-171° C.; first at atmospheric pressure, and then vacuum was applied and distillation was continued. The progress of the reaction was evaluated by the determination of the acid value and by NMR spectroscopy. After 16 h at 171° C. and 24 mbar the acid value had decreased to ≤0.2 me/g and the reaction was stopped. The product is very viscous when cold.

Quaternisation:
245.3 g (0.19 mol) of the obtained polyesterpolyamine, warmed up to about 50° C., was mixed with 75.0 g of IPA and the resulting mixture was transferred to the quaternisation autoclave, where it was heated to 60° C. Thereafter 30 g (0.594 mol) of methyl chloride was added, and a strong exothermic reaction took place. The reaction mixture was then further heated at 85° C. When the pressure in the autoclave became constant, the total amount of basic nitrogen had dropped to 0.04 mmol/g, and the $^1$H-NMR spectrum of the solution of the product did not show any changes, the reaction was stopped. The final product was a dark brown viscous liquid.

Example 4

Synthesis of VIIIa

Esterification:

2 moles of N—(Coco alkyl)-N-methylethanolamine, 4 moles of phthalic acid anhydride, 3 moles of N-methyldiethanolamine and 0.24% (w/w) of catalyst (methanesulfonic acid) were added to a round bottom flask, fitted with a condenser, a thermometer, a heating mantel, a nitrogen inlet and a mechanical stirrer. The temperature of the reaction mixture was gradually raised till 165° C. and the water produced during the reaction was distilled off. The distillation was carried out at 165-171° C.; first at atmospheric pressure, and then vacuum was applied and distillation was continued. The progress of the reaction was evaluated by NMR spectroscopy. After 16 h at 171° C. and 14 mbar the $^1$H-NMR spectrum of the solution of the product showed that all phthalic anhydride had reacted and the reaction was stopped. Since the product is like a "caramel" when cold, 24% (w/w) of IPA was added to the reaction mixture at 70° C.

Quaternisation:

Then the obtained polyesterpolyamine was mixed with 20% (w/w) of IPA and the resulting mixture was transferred to the quaternisation autoclave, where it was heated to 60° C. Thereafter 5 moles of methyl chloride was added, and a strong exothermic reaction took place. The reaction mixture was then further heated at 85° C. When the pressure in the autoclave became constant, the total amount of basic nitrogen had dropped to 0.04 mmol/g, and the $^1$H-NMR spectrum of the solution of the product did not show any changes, the reaction was stopped. The final product was a dark brown liquid.

Example 5

The products in Table 1 were investigated as collectors in flotation tests.

The comparison products A and B have the general formulae below (A)

$$H_3C-\underset{\underset{R}{\overset{CH_3}{|}}}{N^+}-R \quad Cl^-$$

(B)

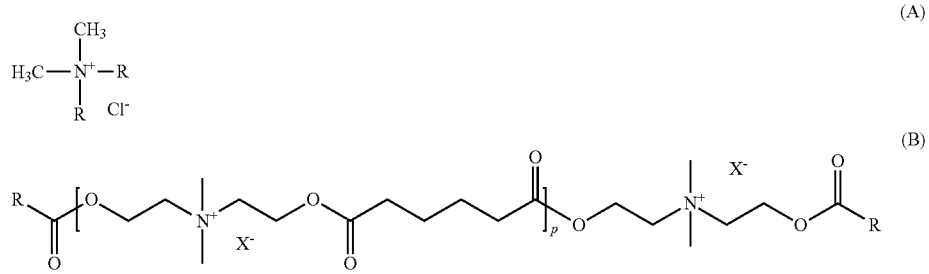

The products according to the invention has the same denotation for the general structures as in the description.

TABLE 1

| Product | R | p (average) | Status |
|---|---|---|---|
| Aa | Coco alkyl | N/A | Comparison |
| Ba | Oleyl | 3 | Comparison |
| Va | Rape seed alkyl | 3 | Invention |
| VIa | C12-16 linear alkyl | 3 | Invention |
| VIIa | C12-16 linear alkyl | 3 | Invention |
| VIIb | C14/C15 alkyl (80% linear)* | 3 | Invention |
| VIIIa | Coco alkyl | 3 | Invention |
| IXa** | N/A | N/A | Cocollector |

*From Neodol 45, commercially available from Shell Chemicals
**Tallow amine + 15EO (Berol 392, commercially available from Akzo Nobel)

All groups X⁻ are Cl⁻ for the compounds in Table 1

General Description of Flotation Tests

Ore Sample:

A calcite ore sample, previously ground to 80%<125 μm, was used in all flotation tests. The crude ore contains 3.5% silicate minerals (quartz, feldspar, amphibole and pyroxene).

Flotation Tests:

Flotation tests were performed in a laboratory batch flotation machine with 1.5 l cell. 0.5 kg ore sample was added to the cell, tap water was added to 1.4 l volume and agitation with 900 rpm was used throughout the tests. The tests were performed at a pH of 8.5 (natural) and at ambient temperature, which was about 20° C.

After addition of collector to an amount of 200 grams collector per metric ton (g/MT) ore sample, and conditioning for one minute, air flow was started and froth was withdrawn for two minutes and collected in a stainless bowl. Another 100 g/MT collector was then added and after one minute conditioning, a second froth product was collected for two minutes, representing the testpoint at total dosage of 300 g/MT. After conditioning with further 100 g/MT collector, a third froth was collected in the same way, representing the testpoint at total dosage of 400 g/MT.

The froth products and the remaining cell product were dried, weighed and analyzed for content of silicate minerals, defined as insoluble in 25% hydrochloric acid.

The content of acid insoluble remaining in the cell product was then calculated after first, second and third flotation step. The results are collected in Table 2.

The selectivity factor is defined as the ratio between the weight percentage of the total "acid insoluble" distributed to the froth, and the weight percentage of calcite distributed to the froth (100−calcite recovery). This should be as high as possible.

TABLE 2

| Test No | Collector product | Total dosage g/MT | Acid insoluble remaining in cell % | Acid insoluble distributed to froth % | Calcite Recovery % | Selectivity factor |
|---|---|---|---|---|---|---|
| NHM-21007 Comparison | Aa | 200 | 0.69 | 80.91 | 98.50 | 53.9 |
| | | 300 | 0.09 | 97.69 | 95.88 | 23.7 |
| | | 400 | 0.03 | 99.26 | 91.73 | 12.0 |
| NHM-21009 Comparison | Ba | 200 | 0.31 | 92.36 | 92.62 | 12.5 |
| | | 300 | 0.14 | 96.76 | 85.17 | 6.5 |
| | | 400 | 0.09 | 98.11 | 78.59 | 4.6 |
| NHM-21002* | Va | 300 | 1.36 | 61.90 | 98.56 | 43.0 |
| NHM-21005 | | 400 | 0.35 | 89.95 | 97.95 | 43.9 |
| NHM-21012 | VIa | 200 | 0.35 | 90.36 | 97.85 | 42.0 |
| | | 300 | 0.11 | 97.20 | 92.94 | 13.8 |
| | | 400 | 0.06 | 98.44 | 88.20 | 8.3 |
| NHM-21008 | VIIa | 200 | 0.57 | 84.53 | 98.17 | 46.2 |
| | | 300 | 0.11 | 97.20 | 95.23 | 20.4 |
| | | 400 | 0.04 | 98.88 | 92.27 | 12.8 |
| NHM-21022 | VIIb | 200 | 1.51 | 56.22 | 99.39 | 91.7 |
| | | 300 | 0.4 | 88.61 | 98.44 | 56.9 |
| | | 400 | 0.19 | 94.55 | 97.58 | 39.1 |
| NHM-21023 | 80% VIIb 20% IXa | 200 | 0.56 | 84.61 | 97.82 | 38.8 |
| | | 300 | 0.10 | 97.33 | 95.99 | 24.2 |
| | | 400 | 0.04 | 98.96 | 93.96 | 16.4 |
| NHM-21018 | VIIIa | 200 | 0.35 | 90.99 | 95.06 | 18.4 |
| | | 300 | 0.07 | 98.40 | 90.65 | 10.5 |
| | | 400 | 0.03 | 99.26 | 87.48 | 7.9 |

*Test NHM-21002 was aborted after collecting the froth at 300 g/MT total dosage of collector.

Example 6

Hydrolytic Stability Tests

To study the hydrolysis effect on collector efficiency, prolonged conditioning at pH 10 and a temperature of 30° C. was applied prior to flotation according to Example 5. Dosage of collector was 600 g/MT. The results are seen in Table 3.

TABLE 3

| | Collector Ba (Comparative) | | Collector VIIa | |
|---|---|---|---|---|
| Conditioning time at pH 10 and 30° C. minutes | Acid insoluble remaining in cell % | Calcite recovery % | Acid insoluble remaining in cell % | Calcite recovery % |
| 2.5 | 0.27 | 93.61 | 0.13 | 93.82 |
| 5 | 0.70 | 96.52 | 0.43 | 97.14 |
| 10 | 1.84 | 97.02 | 0.59 | 97.74 |

Measurement of Relative Hydrolysis Rates

The resistance against hydrolysis of three different polymeric quaternary ester products was analyzed in aqueous solution at pH 10. During the hydrolysis two different parameters were evaluated; the amount of NaOH consumed to neutralize the acid formed during the hydrolysis, and the change in cationic activity. The amount of NaOH consumed is directly proportional to the amount of acid liberated during the hydrolysis. Since the products are charged surfactants before hydrolysis and charged, but not surfactants anymore, after hydrolysis, the loss of cationic activity has been measured as well.

Procedure for Hydrolysis of the Polymeric Quaternary Ester Products.

0.3-0.4 g of the respective product was dissolved in 100 ml of distilled water. Then 0.02M aqueous NaOH solution was added to adjust the pH of the solution to 9.5, which was taken as the starting point of the hydrolysis experiment (time=0 min). Thereafter the pH was raised to 10.0 and kept constant during 1 h by the further addition of the NaOH solution. The value of pH=9.5 was taken as the starting point, since pH changed in the interval from 9.5 to 10.0 quite slowly due to already started hydrolysis and neutralization of liberated acid. In all experiments pH 10.0 was reached at 1-2 min after the start of the experiment. The amount of NaOH consumed was measured after 1, 2, 3, 4, 5, 6, 7, 8, 9, 10, 15, 20, 30, 45 and 60 min.

Five ml samples were taken at 2, 5, 10, 30 and 60 min after hydrolysis starting time for evaluation of cationic activity. In order to measure cationic activity the 5 ml sample was mixed with 5 ml of sodium citrate buffer pH=2, 10 ml of 0.004 M sodium lauryl sulphate and 5 ml of chloroform. The emulsion titration was performed on a Metrohm titration equipment (potentiograph Metrohm E-536, photometer Metrohm E-616 and dosator Metrohm E-535, with stirrer E-649) with 0.004M 1,3-didecyl-2-methyl imidazolium chloride (Hellsten M, "Titration of anionic surfactants with cationic. Instrumental method for the end point determination". Chimie physique et applications pratiques des agents de surface. Vol I page 292-298. Ediciones Unidas, S A, Barcelona). Loss of cationic activity means the difference between initial cationic activity (before hydrolysis) and measured cationic activity at a certain time.

Figure 2:
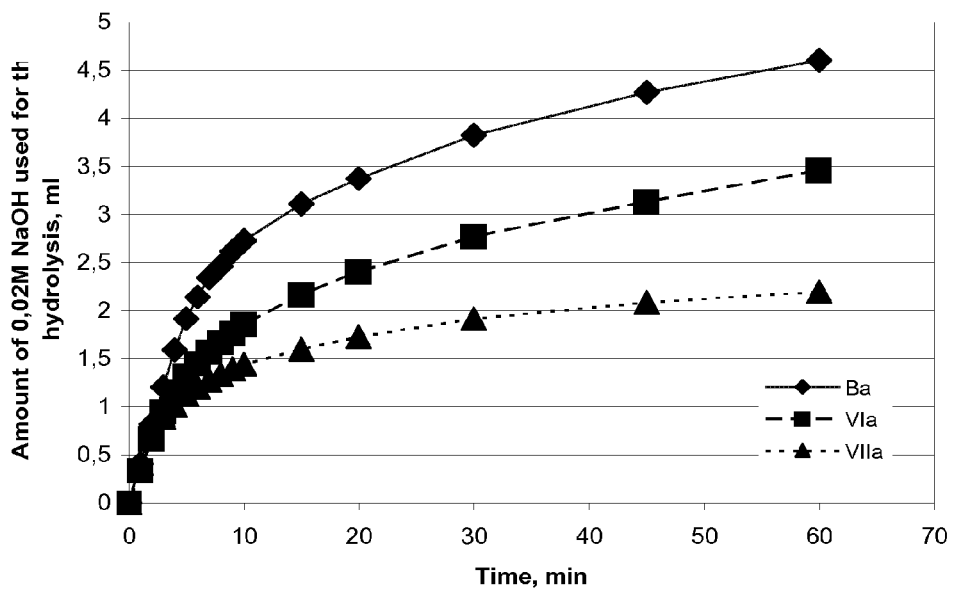

As is shown in FIG. 1, the polymeric quaternary ester product based on phthalic acid (VIIa) after 10 min of hydrolysis has 90% remaining cationic activity, however the two other polymeric quaternary ester products based on adipic acid (VIa and Ba) have lost 40-50% of cationic activity already after 10 min. Of the polymeric quaternary ester products based on adipic acid, the product according to the invention (VIa) retains more cationic activity than the comparative product (Ba). The same trend is seen in FIG. 2. The polymeric quaternary ester product based on phthalic acid (VIIa) has a lower rate of consumption of NaOH as compared to the products based on adipic acid, and of the products based on adipic acid, the one according to the invention (VIa) has a lower rate of consumption of NaOH than the comparative product (Ba).

The invention claimed is:

1. A method for froth flotation of a mineral-containing ore, the method comprising contacting the ore with:
   a) a product obtainable by the condensation, in one or several steps, of:
      i) a compound having the formula

(I)

where $R^1$ is a hydrocarbyl group having 7-24 carbon atoms, which may be branched or linear, saturated or unsaturated, AO is an alkyleneoxy group having 2-4 carbon atoms, n is a number between 0 and 20, and Y is O, C(=O)NH or NZ, where Z is a group $R^2$, where $R^2$ is a C1-C4 alkyl group, or the benzyl group, provided that when Y is NZ or C(=O)NH, then n is ≥1;

ii) a dicarboxylic acid or a derivative thereof having the formula (IIa) or (IIb)

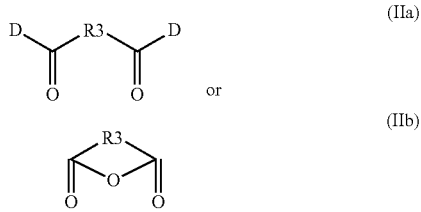

where D is —OH, —Cl, or —$OR^4$, where $R^4$ is a C1-C4 alkyl group; R3 is an alkylene radical of formula —$(CH_2)_z$—, in which z is an integer from 0 to 10, and in which the alkylene radical may be substituted by 1 or 2 —OH groups; the group —CH=CH—, a cycloalkylene, a cycloalkenylene, or an arylene group; and iii) an alkanolamine having the formula (III)

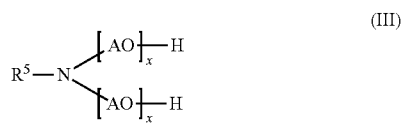

where each x independently is a number between 1 and 5 and Σx on average is a number between 2 and 10, AO is an alkyleneoxy group having 2-4 carbon atoms, $R^5$ is a C1-C3 alkyl group or a group $[AO]_x$ where AO and x have the same meaning as above;

followed by reaction with an alkylating agent $R^6X$, where $R^6$ is a hydrocarbyl group and $X^-$ is an anion derived from the alkylating agent $R^6X$; or b) a product obtainable by the condensation of:
 i) compound (I), or of a compound obtained by partial or total quaternisation of (I);
 ii) (IIa) or (IIb); and
 iii) a compound obtained by partial or total quaternisation of the alkanolamine (III).

2. The method according to claim 1 where the condensation product comprises a compound of the formula where $R^1$, Y, AO, n, R3, x and $R^5$ have the same meaning as in claim 1; t is 0 when Y is O or C(=O)NH, and t is 1 when Y is NZ; $R^6$ is a hydrocarbyl group and $X^-$ is an anion derived from the alkylating agent $R^6X$; and p is a number within the range 1-15.

3. The method according to claim 2, where more than 50% by weight of the molecules has a value of p≥3.

4. The method of claim 1 wherein the froth flotation is reverse froth flotation and wherein the ore contains silicates.

5. The method according to claim 4, where the ore contains calcium carbonate or ferruginous minerals.

6. The method according to claim 1, where Y is O and n=0.

7. The method according to claim 1, where Y is NZ and n is 1.

8. The method according to claim 1, where R3 is arylene.

9. The method according to claim 1, wherein said dicarboxylic acid or a derivative thereof having the formula (IIa) or (IIb) is selected from the group consisting of tetrahydrophtalic acid, the acid chloride, methyl ester or ethyl ester of tetrahydrophtalic acid, and the cyclic anhydride of tetrahydrophtalic acid.

10. The method according to claim 1, where R3 is an alkylene radical of formula —$(CH_2)_z$— in which z is an integer from 2 to 4.

11. The method according to claim 1, where $R^5$ is $CH_3$, AO is ethyleneoxy and x=1.

12. The method according to claim 1 where the condensation product comprises a compound of the formula

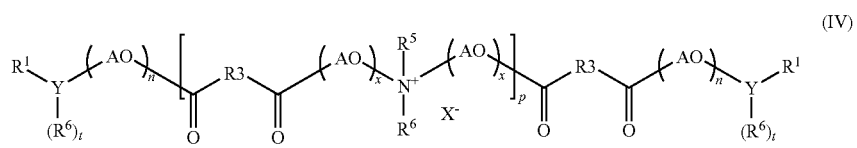

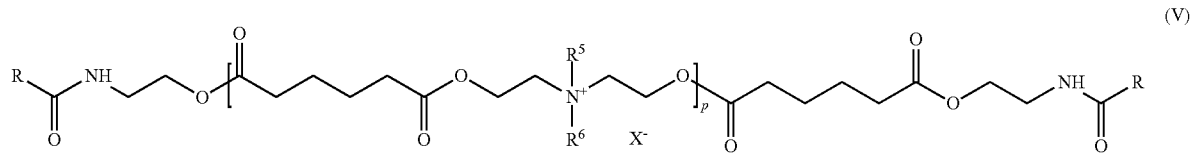

(V)

where R is a linear or branched, saturated or unsaturated acyl group having 8 to 24 carbon atoms, p is on average $\geq 3$, $R^5$ is a C1-C3 alkyl group, $R^6$ is a C1-C4 hydrocarbyl group and X=Cl, Br, $CH_3OSO_3$, or $CH_3OCO_2$.

13. The method according to claim 1 where the condensation product comprises a compound of the formula

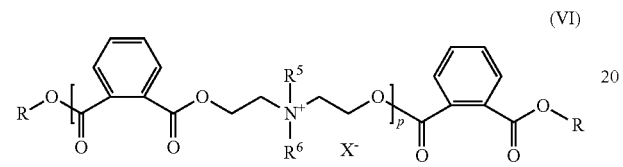

(VI)

where R is a linear or branched, saturated or unsaturated hydrocarbyl group having 8 to 24 carbon atoms, p is on average $\geq 3$, $R^5$ is a C1-C3 alkyl group, $R^6$ is a C1-C4 hydrocarbyl group, and X=Cl, Br, $CH_3OSO_3$, or $CH_3OCO_2$.

14. The method according to claim 1 where the condensation product comprises a compound of the formula

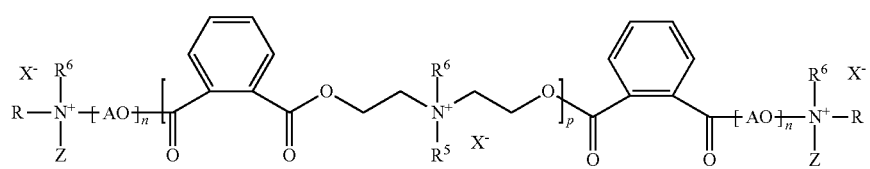

(VIII)

where R is a linear or branched, saturated or unsaturated hydrocarbyl group having 8 to 24 carbon atoms, AO is an alkyleneoxy group having 2-4, carbon atoms, n is a number between 1 and 20, Z is a group $R^2$, where $R^2$ is a C1-C4 alkyl group, or the benzyl group, p is on average $\geq 3$, $R^5$ is a C1-C3 alkyl group, $R^6$ is a C1-C4 hydrocarbyl group and X=Cl, Br, $CH_3OSO_3$, or $CH_3OCO_2$.

* * * * *